(12) United States Patent
Theado et al.

(10) Patent No.: US 9,009,221 B2
(45) Date of Patent: Apr. 14, 2015

(54) TRANSACTION SERVICES MANAGEMENT SYSTEM

(75) Inventors: Brian P. Theado, Canal Winchester, OH (US); Gregory Cleary, Dayton, OH (US); Khoa N. Nguyen, Westerville, OH (US); Lloyd S. Palmer, Jr., Hilliard, OH (US); Manh Nguyen, Annandale, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 396 days.

(21) Appl. No.: 13/332,542

(22) Filed: Dec. 21, 2011

(65) Prior Publication Data

US 2013/0166628 A1     Jun. 27, 2013

(51) Int. Cl.
  *G06F 15/16*   (2006.01)
  *G06Q 20/20*   (2012.01)
  *G06Q 20/40*   (2012.01)

(52) U.S. Cl.
  CPC .............. *G06Q 20/40* (2013.01); *G06Q 20/20* (2013.01)

(58) Field of Classification Search
  USPC ........ 709/203, 223, 232; 370/395.1, 325, 392
  See application file for complete search history.

(56) References Cited

U.S. PATENT DOCUMENTS

| | | | |
|---|---|---|---|
| 6,604,136 B1 * | 8/2003 | Chang et al. | 709/223 |
| 6,614,781 B1 * | 9/2003 | Elliott et al. | 370/352 |
| 6,735,773 B1 * | 5/2004 | Trinh et al. | 719/328 |
| 6,839,767 B1 * | 1/2005 | Davies et al. | 709/232 |
| 7,240,364 B1 * | 7/2007 | Branscomb et al. | 726/9 |
| 7,478,151 B1 * | 1/2009 | Maiocco et al. | 709/223 |
| 7,526,496 B2 * | 4/2009 | Boggs | 1/1 |
| 7,627,496 B2 * | 12/2009 | Walker et al. | 705/16 |
| 7,707,170 B2 * | 4/2010 | Boggs | 707/602 |
| 7,725,434 B2 * | 5/2010 | Boggs | 707/613 |
| 7,743,021 B2 * | 6/2010 | Boggs | 707/610 |
| 7,747,571 B2 * | 6/2010 | Boggs | 707/613 |
| 7,814,201 B2 * | 10/2010 | Maiocco et al. | 709/224 |
| 8,203,967 B2 * | 6/2012 | Boggs | 370/255 |
| 8,307,006 B2 * | 11/2012 | Hannan et al. | 707/791 |
| 8,332,303 B2 * | 12/2012 | Buckwalter et al. | 705/37 |
| 8,520,554 B2 * | 8/2013 | Boggs | 370/255 |
| 2003/0123448 A1 * | 7/2003 | Chang | 370/395.1 |
| 2013/0166446 A1 * | 6/2013 | Pujari et al. | 705/44 |
| 2014/0172472 A1 * | 6/2014 | Florimond et al. | 705/5 |
| 2014/0269728 A1 * | 9/2014 | Jalan et al. | 370/392 |

* cited by examiner

*Primary Examiner* — Tammy Nguyen

(57) ABSTRACT

One or more network devices send to a user device a user interface with options for configuring a network to provide transaction services between transaction devices and host processing devices. The user interface is accessible to the user device via a private network connection. The one or more network devices receive from the user device configuration settings for a particular host processing device. The one or more network devices store the configuration settings in a database of transaction services data for multiple host processing devices, to be accessed by another device within the network for configuring the network for the particular host processing device.

20 Claims, 15 Drawing Sheets

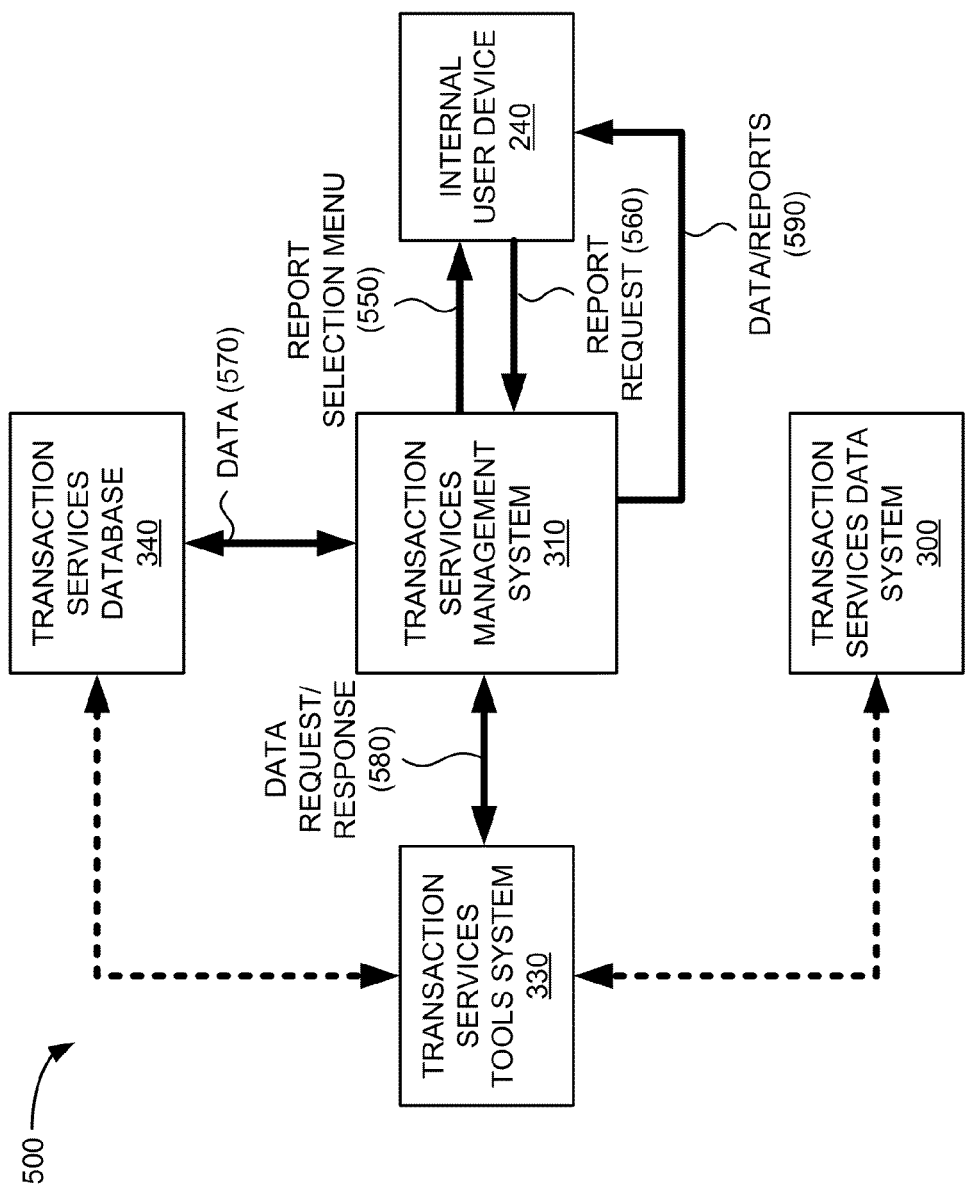

Transaction Services Management Systems

Home | Summary | Ingress | RTabs | BTabs | Customers | Hosts | Equipment | CCRs | TraxCfg Summary : New Version Rollout : Create New

Ingress TcpPort Summary View     Production - v.136 ▼

| Ingress | TcpPort | Route | BillClass | Customer | | Executable | FullDetailReport |
|---|---|---|---|---|---|---|---|
| 8774883092 | 10009 | EMT2 | 34 | Emdeon | | v1.22 | report |
| 8003827520 | 10011 | EMP1 | 34 | Emdeon | | v1.23 | report |
| 8008850278 | 10012 | EMP1 | 34 | Emdeon | | v1.23 | report |
| 8006650088 | 10013 | EMP1 | 34 | Emdeon | | v1.23 | report |
| 8008542417 | | | | | | | |
| 8883828701 | 10014 | EMP1 | 34 | Emdeon | | v1.23 | report |
| 8002885858 | 10023 | EMP1 | 34 | Emdeon | | v1.23 | report |
| 8003866022 | | | | | | | |
| 8009317758 | | | | | | | |
| 8003311256 | 10024 | EMP1 | 34 | Emdeon | | v1.22 | report |
| 8683802871 | | | | | | | |
| 8006572814 | 10025 | EMP1 | 34 | First Data Corp | | v1.22 | report |
| 8001841111 | 10030 | FDSQ | 24 | First Data Corp | | v1.22 | report |
| 8001934444 | 10031 | FDS1 | 24 | First Data Corp | | v1.22 | report |
| 8771655286 | | | | | | | |
| 8842830011 | 10032 | EMT3 | 34 | Emdeon | | v1.22 | report |
| 8863287528 | 10038 | E89A | 34 | First Data Corp | | v1.22 | report |
| 8001688880 | 10042 | TLIA | 34 | First Data Corp | | v1.22 | report |
| 8003998890 | | | | | | | |
| 8770880012 | 10043 | TLMX | 13 | First Data Corp | | v1.22 | report |
| 8662307528 | 10051 | E99 | 34 | First Data Corp | | v1.22 | report |
| 8923317284 | 10054 | FDN1 | 34 | First Data Corp | | v1.22 | report |

Case Sensitive ☐

Search

810 → (tab bar)
820 → (table)
800

FIG. 8

| BLADE ID | Blade Name | Minutes Sum | Bytes Rx Crrnt Max | Bytes Rx Crrnt Avg | Bytes Rx Crrnt Sum | Bytes Tx Crrnt Max | Bytes Tx Crrnt Avg | Bytes Tx Crrnt Sum | Active Session Count Max | Active Session Count Avg | Oldest Session Age Max | Session Start Crrnt Max | Session Start Crrnt Avg | Session Start Crrnt Sum | Session End Crrnt Max | Session End Crrnt Avg | Session End Crrnt Sum | Avg Session Count Min | Avg Session Count Max | Max Session Count Max |
|---|---|---|---|---|---|---|---|---|---|---|---|---|---|---|---|---|---|---|---|---|
| 1 | ATL5-AXP1 | 198799 | 1089903 | 42168.8 | 1685909718 | 638917 | 21478.4 | 858706679 | 157 | 4.8 | 50792 | 7437 | 258.2 | 10323997 | 7439 | 258.2 | 10323990 | 35 | 0 | 174 |
| 1 | ATL5-AXP2 | 198799 | 1081228 | 42559.5 | 1701528611 | 602691 | 21666.1 | 866211391 | 157 | 4.8 | 49916 | 7478 | 260.2 | 10405391 | 7485 | 260.2 | 10405378 | 33 | 0 | 169 |
| 2 | CHI2-AXP1 | 198799 | 828304 | 31710.5 | 1267779131 | 486469 | 16337.9 | 653186889 | 109 | 3.5 | 48572 | 5662 | 193.8 | 7754049 | 5667 | 193.8 | 7754056 | 16 | 0 | 128 |
| 2 | CHI2-AXP2 | 198799 | 844092 | 32412.4 | 1295848391 | 503105 | 16864 | 666227105 | 115 | 3.6 | 49442 | 5796 | 197.7 | 7907783 | 5789 | 197.7 | 7907804 | 15 | 0 | 130 |
| 5 | DFW9-AXP1 | 198799 | 964217 | 37604.8 | 1503438945 | 577460 | 19406.5 | 775870744 | 135 | 4.3 | 50491 | 6579 | 230.4 | 9214003 | 6557 | 230.4 | 9214006 | 23 | 0 | 165 |
| 5 | DFW9-AXP2 | 198799 | 959742 | 38027.8 | 1520348960 | 611297 | 19583.6 | 782352696 | 134 | 4.3 | 50672 | 6544 | 231.9 | 9275688 | 6549 | 231.9 | 9275696 | 21 | 0 | 165 |
| 7 | NYC9-AXP1 | 198799 | 649336 | 24357 | 973791388 | 362057 | 12443.6 | 497498710 | 88 | 2.7 | 47782 | 4349 | 149.5 | 5979115 | 4346 | 149.5 | 5979120 | 19 | 0 | 103 |
| 9 | NYC9-AXP2 | 198799 | 651916 | 24593.8 | 983261758 | 382342 | 12505.1 | 499955638 | 92 | 2.8 | 48623 | 4381 | 150.9 | 6034275 | 4380 | 150.9 | 6034286 | 16 | 0 | 103 |

FIG. 10

Transaction Services Reporting Systems

Home | Active Alarms | Alarm Email | History Alarms | Heuristic Alarm Configuration | Logout

| Clear Alarm | ALARM_SEQ | STATE | ALARM_ID | ALARM_DESC | FIRST_SEEN | LAST_SEEN | ORIGIN_APP | APP_ID | IPDEST_ID | IPDEST_IP | IPDEST_PORT | ALARM_COUNT | CLEAR_COUNT | CAUSE |
|---|---|---|---|---|---|---|---|---|---|---|---|---|---|---|
| ☐ | 532 | ACTIVE | 1.4 | Host DOWN | 20110505228139 | 20110506141939 | | | 345 | 170.138.232.25 | 6407 | 232 | | 120 |
| ☐ | 3239865 | ACTIVE | 1.4 | Host DOWN | 20110711204838 | 20110711204848 | | | 283 | 204.194.128.30 | 28580 | 2 | | 0 |
| ☐ | 3237955 | ACTIVE | 1.4 | Host DOWN | 20110711153915 | 20110712152846 | | | 102 | 167.16.0.52 | 30838 | 4 | | 1 |
| ☐ | 3237952 | ACTIVE | 1.4 | Host DOWN | 20110711153916 | 20110712152846 | | | 111 | 167.16.0.54 | 30854 | 2 | | 0 |
| ☐ | 3237954 | ACTIVE | 1.4 | Host DOWN | 20110711153916 | 20110712152847 | | | 12 | 167.16.0.81 | 14051 | 3 | | 1 |
| ☐ | 3237949 | ACTIVE | 1.4 | Host DOWN | 20110711153916 | 20110712153341 | | | 15 | 167.16.0.82 | 14052 | 2 | | 0 |
| ☐ | 3237951 | ACTIVE | 1.4 | Host DOWN | 20110711153917 | 20110712153341 | | | 100 | 167.16.0.50 | 30854 | 3 | | 1 |
| ☐ | 3237950 | ACTIVE | 1.4 | Host DOWN | 20110711153927 | 20110712153341 | | | 107 | 167.16.0.52 | 30854 | 3 | | 1 |
| ☐ | 3238869 | ACTIVE | 1.4 | Host DOWN | 20110711221442 | 20110712153341 | | | 13 | 167.16.0.81 | 14052 | 4 | | 2 |
| ☐ | 3241534 | ACTIVE | 1.4 | Host DOWN | 20110712152847 | 20110712153341 | | | 18 | 167.16.0.82 | 14054 | 2 | | 0 |
| ☐ | 3237953 | ACTIVE | 1.4 | Host DOWN | 20110711153916 | 20110712153341 | | | 8 | 167.16.0.82 | 14051 | 3 | | 0 |
| ☐ | 533 | ACTIVE | 1.4 | Host DOWN | 20110505220139 | 20110714221740 | | | 97 | 167.16.0.50 | 30838 | 1258 | | 629 |
| ☐ | 1718 | OSCILLATE | 1.4 | Host DOWN | 20110709164464 | 20110714223451 | | | 293 | 170.138.236.21 | 6409 | 3592 | | 1799 |

Clear Alarms

FIG. 12

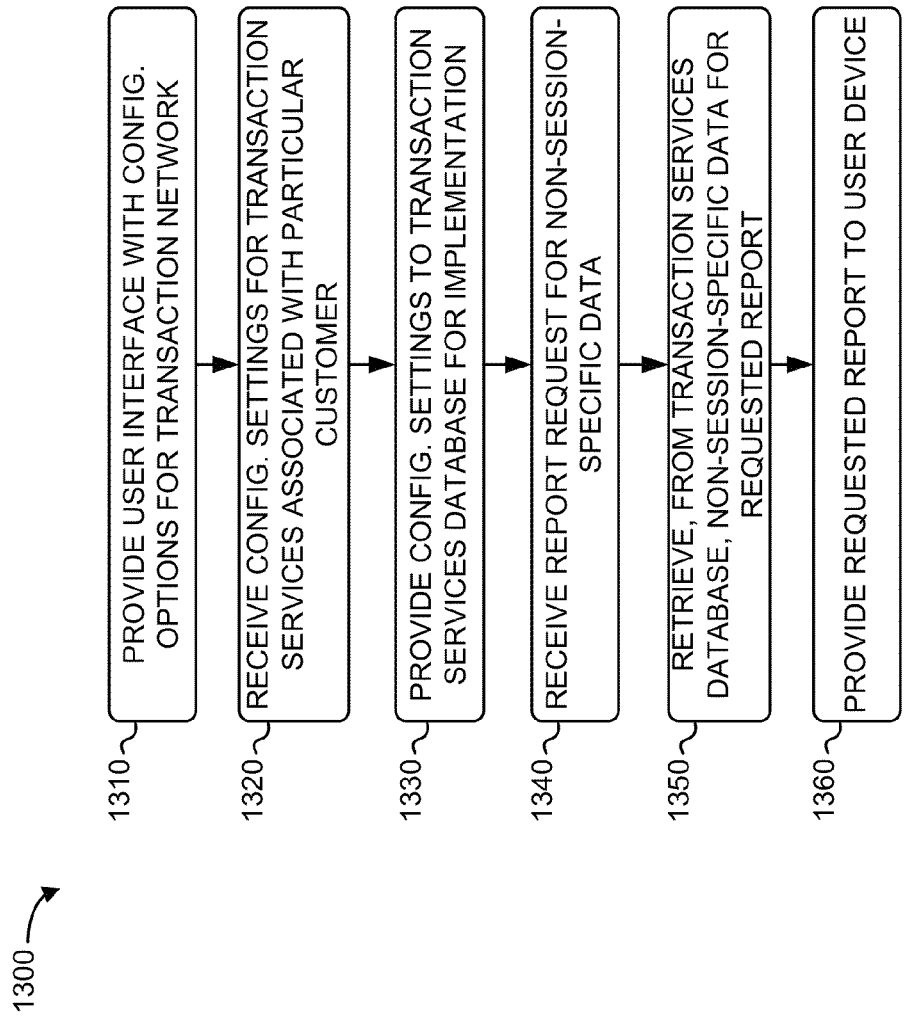

TRANSACTION SERVICES MANAGEMENT SYSTEM

BACKGROUND

Transaction services may generally include data communications over a network to support a secure transaction. Transaction services may be characterized by short sessions to support inquiry-and-response applications. Transaction applications may include, for example, credit/debit card authorization, automated teller machine (ATM) activity, insurance verification, and home health monitoring. Transaction services providers may include network providers, which can benefit from a variety of reporting and configuration management options to support transaction services.

BRIEF DESCRIPTION OF THE DRAWINGS

FIGS. 5A and 5B are diagrams of exemplary communications for a portion of the network of FIG. 2;

FIG. 8 is a diagram of a configuration user interface for the transaction services management system of FIG. 3;

FIG. 10 is a diagram of a blade status user interface for the transaction services management system of FIG. 3;

FIG. 12 is a diagram of an alarm reporting user interface for the transaction services management system of FIG. 3; and FIG. 13 is a flowchart of an exemplary process for providing transaction management services, according to an implementation described herein.

DETAILED DESCRIPTION OF PREFERRED EMBODIMENTS

The following detailed description refers to the accompanying drawings. The same reference numbers in different drawings may identify the same or similar elements.

Transaction services may be provided to entities that need a network solution for short (e.g., typically 15 seconds or less) connections for their customers (e.g., merchants) to reach their hosts. A majority of traffic in transaction services can arise from credit or debit card transactions; but other types of traffic may also utilize these services, including insurance verification, home health monitoring, processing of fishing and hunting licenses, etc. Transaction services customers are typically referred to as "processors" or "hosts" that act as middle men between, for example, merchants on one end and banks or card marketing organizations (e.g., Visa®, Mastercard®, etc.) on the other end.

Systems and/or methods described herein may include one or more devices within a transaction services hub to provide users with customized management and reporting capabilities for a transaction services network. In one implementation, the devices within a transaction services hub may send to a user device a user interface with options for configuring a network to provide transaction services between merchants' transaction devices and hosts' processing devices. Access to the user interface may be restricted to user devices connecting via a private network connection. The devices within a transaction services hub may receive from the user device configuration settings for a particular host's processing device. The devices may store the configuration settings in a database of transaction services data for multiple host processing devices, to be accessed by another device within the network for configuring the network for the particular host processing device.

Figure 1:
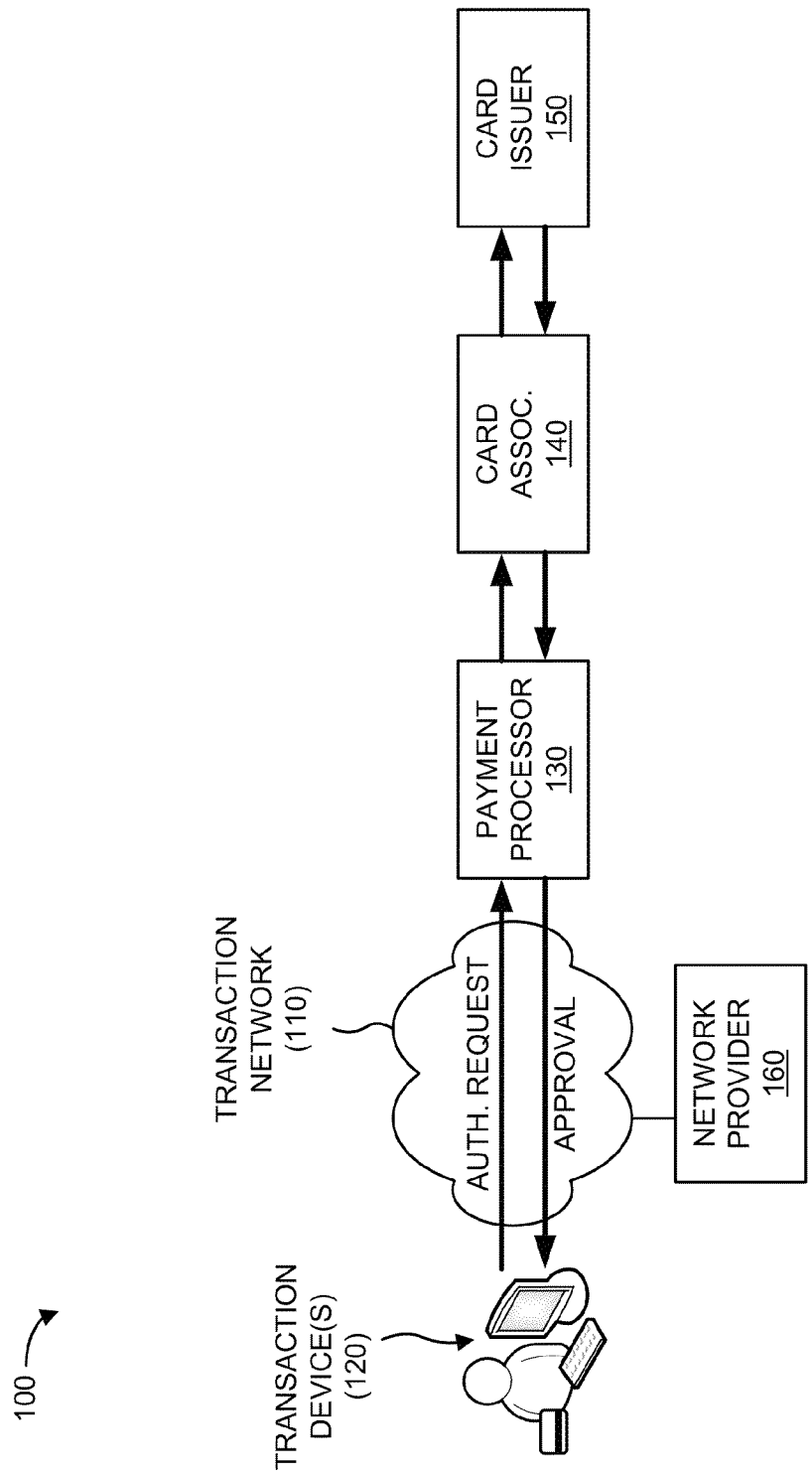
FIG. 1 is a diagram that illustrates an exemplary network in which systems and/or methods, described herein, may be implemented.

FIG. 1 is a diagram that illustrates an exemplary network 100 in which systems and/or methods described herein may be implemented. As shown in FIG. 1, network 100 may include a transaction network 110, a transaction device 120, a payment processor 130, a card association 140, a card issuer 150, and a network provider 160. Devices and/or networks of FIG. 1 may be connected via wired and/or wireless connections.

Transaction network 110 may include a network to facilitate data communications, such as credit card authorizations, between transaction device 120 and payment processor 130. Particularly, transaction network 110 may facilitate transactions characterized by short sessions, low bandwidth requirements, and quick call set-ups, for inquiry-response applications. Transaction network 110 may generally include one or more wired, wireless, and/or optical networks that are capable of receiving and transmitting data, voice and/or video signals. For example, transaction network 110 may include one or more public switched telephone networks (PSTNs) or another type of switched network. Transaction network 110 may also include one or more wireless networks and may include a number of transmission towers for receiving wireless signals and forwarding the wireless signals toward the intended destination. Transaction network 110 may further include one or more satellite networks, one or more packet switched networks, such as an Internet protocol (IP) based network, a local area network (LAN), a wide area network (WAN), a personal area network (PAN), a WiFi network, a Bluetooth network, an intranet, the Internet, or another type of network that is capable of transmitting data. In some implementations, transaction network 110 may include a private network controlled by, for example, a telecommunications company (e.g., network provider 160) that provides telephone and/or data access to transaction device 120. In another implementation, transaction network 110 may include a public network, such as the Internet, or a combination of public and private networks. Transaction network 110 is described further in connection with, for example, FIGS. 2 and 3.

Transaction device(s) 120 may include one or more computing devices and/or servers that participate in a transaction, such as a purchase of goods or services from a merchant or other entity associated with transaction device 120. For example, transaction device 120 may include an electronic cash register or point-of-sale system at a retail location or another device/system that is able to receive payment information and/or other information from a user and/or a payment card (e.g., credit card, identity card, etc.). Additionally, or alternatively, transaction device may include a personal computer, a laptop computer, a tablet or "pad" computer, a personal communications system (PCS) terminal (e.g., that may combine a cellular radiotelephone with data processing and data communications capabilities), a personal digital assistant (PDA, e.g., that can include a radiotelephone, a pager, Internet/intranet access, etc.), a smartphone, or other types of computation and/or communication devices. In one implementation, transaction device 120 may include any device (e.g., an IP-based device) that enables a user to access the Internet and/or communicate with other devices. In one implementation, transaction device 120 may communicate with payment processor 130 via transaction network 110 when a transaction (e.g., a credit card purchase, point-of-sale transaction, etc.) is taking place.

Payment processor 130 may include one or more server devices, or other types of computation or communication devices, that gather, process, search, and/or provide information in a manner described herein. Payment processor 130 (also referred to as a "host") may route an authorization request from transaction device 120 to a particular card association 140. Payment processor 130 may be included, for example, within a customer's private network. In one implementation, payment processor 130 may receive, via transaction network 110, an inquiry (e.g., an authorization request) from transaction device 120 and provide a response (e.g., an approve/decline decision from card issuer 150) to transaction device 120 to facilitate a data transaction.

Card association 140 may include one or more server devices, or other types of computation or communication devices. Card association 140 may include, for example, an entity formed to administer and promote credit cards (e.g., Visa, Master Card, etc.).

Card issuer 150 may include one or more server devices, or other types of computation or communication devices. Card issuer 150 may include, for example, a bank or other institution that authorizes a transaction (e.g., verifies that sufficient funds are associated with a credit card, verifies access rights, etc.). In one implementation, card issuer 150 may receive an authorization request that originates from transaction device 120 and provide a response and/or authorization code to approve a transaction.

Network provider 160 may include an entity that provides and manages all or a portion of transaction network 110. Network provider 160 may receive fees (e.g., a per-transaction fee, flat fee, etc.) for providing transaction services via transaction network 110.

According to an implementation described herein, a merchant may utilize transaction device 120 to initiate transaction services (e.g., a credit card authorization request), via transaction network 110, originating using either a dial (e.g., voice network) or non-dial (e.g., Internet) connection. Regardless of the originating connection from transaction device 120, transaction network 110 may provide a single interface to payment processor 130. As described further herein, transaction network 110 may provide secure connections with management and reporting tools for network administrators of transaction network 110 (e.g., employees of network provider 160).

The exemplary configuration illustrated in FIG. 1 is provided for simplicity. It should be understood that a typical network may include more or fewer devices than illustrated in FIG. 1. For example, network 100, may include thousands of transaction devices 120 via which transactions may be made. In addition, network 100 may include additional elements, such as switches, gateways, routers, etc., that aid in routing data. Also, various functions are described below as being performed by particular components in network 100. In other implementations, various functions described as being performed by one device may be performed by another device or multiple other devices, and/or various functions described as being performed by multiple devices may be combined and performed by a single device.

Figure 2:
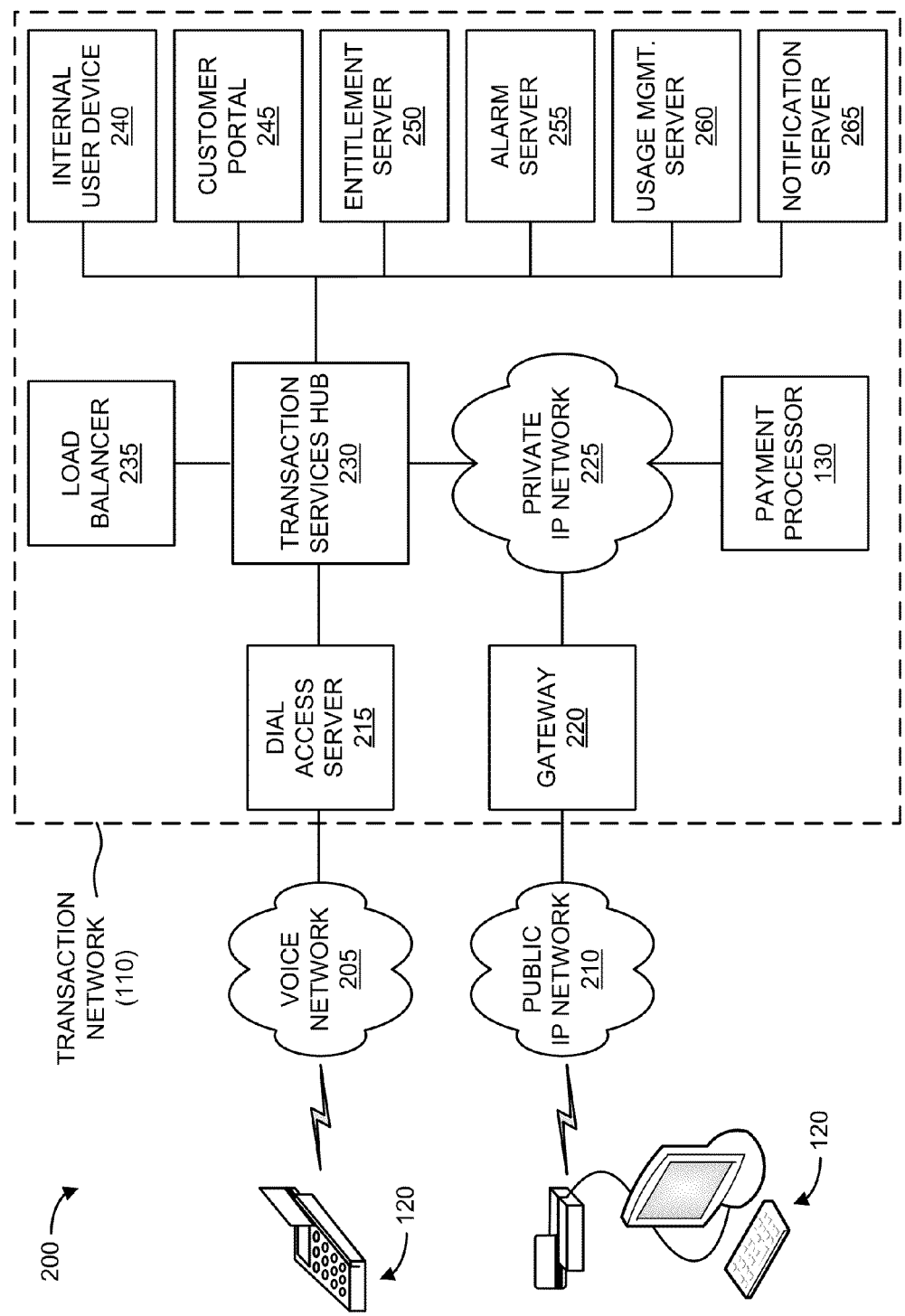
FIG. 2 is a diagram that illustrates additional details of a portion of the network of FIG. 1.

FIG. 2 provides a diagram of a portion 200 of network 100. As shown in FIG. 2, network portion 200 may include transaction devices 120, payment processor 130, a voice network 205, a public IP network 210, a dial access server 215, a gateway 220, a private IP network 225, a transaction services hub 230, a load balancer 235, an internal user device 240, a customer portal server 245, an entitlement server 250, an alarm server 255, a usage management server 260, and a notification server 265. Transaction devices 120 and payment processor 130 may include features described above in connection with FIG. 1.

Voice network 205 may include components that facilitate transfer of voice traffic and/or data traffic. For example, voice network 205 may include a PSTN, a domestic toll-free voice network, and/or an international toll-free voice network.

Public IP network 210 may include a wide area network, an intranet, or a combination of networks that support IP communications. Public IP network 210 may include, for example, an untrusted network, such as the Internet. Public IP network 210 may further include transport and/or network devices such as routers, switches, and/or firewalls.

Dial access server 215 may include one or more server devices, or other types of computation or communication devices. In one implementation, dial access server 215 may receive circuit-based signals and demodulate voice-band data of the circuit-based signals. The dial access server 215 may then extract IP packets for routing (e.g., via a TCP connection) to the appropriate destination, such as transaction services hub 230.

Gateway 220 may include one or more data transfer devices (or network devices), such as a gateway, a router, a switch, a firewall, a network interface card (NIC), a hub, a bridge, a proxy server, an optical add-drop multiplexer (OADM), or some other type of device that provides an interface between different network types. In one implementation, gateway 220 may include a hyper-text transfer protocol (HTTP) gateway or a secure socket layer (SSL) gateway to act as intermediary between public IP network 210 and private IP network 225.

Private IP network 225 may include devices and/or systems for providing services, such as a service for data transfers, voicemail, call blocking, calling card, audio, and/or network conferencing, etc. In some implementations, private IP network 225 may provide redundancy and/or the ability to distribute network loads. For example, private IP network 225 may include an IP network or a multiprotocol label switching (MPLS) network implementing an Interior Gateway Protocol (IGP) or another protocol that implements a minimum cost end-to-end path for routing between nodes. Private IP network 225 may provide one or more interface options to payment processor 130 (e.g., residing on a local customer network).

Transaction services hub 230 may include one or more server devices, or other types of computation or communication devices. Transaction services hub 230 may manage transactions from transaction device 120 via voice network 205 and/or from transaction device 120 via public IP network 210 (via gateway 220 and private IP network 225). Transaction services hub 230 may establish/maintain connectivity (e.g., secure TCP/IP sessions) with multiple payment processors 130, may route particular transaction authorization requests from a transaction device 120 to the appropriate payment processor, and may return responses (e.g., from payment processor 130) to the originating transaction device 120. For example, transaction services hub 230 may maintain a persistent socket connection (e.g., multiplexing user sessions over a single TCP session) to payment processor 130. In other implementations, transaction services hub may implement non-persistent socket connections; provide multiple interfaces to multiple payment processors (e.g., with load balancing and/or failover services); and/or support proprietary host protocols, TCP/IP interfaces, X.25 interfaces, etc. Transaction services hub 230 may also collect data regarding the transactions and provide an interface to retrieve reports based on the collected data.

Load balancer 235 may include one or more server devices, or other types of computation or communication devices. Load balancer 235 may receive transaction services requests and load balance the requests over devices in transaction services hub. For example, load balancer 235 may forward a received transaction services request to a device within transaction services hub 230 based on available resources (e.., processing time), geography, etc. For example, in one implementation, transaction services hub may include multiple redundant components with geographic diversity to enable seamless failover if a particular connection between payment processor 130 and transaction services hub 230 fails.

Generally, internal user device 240, customer portal server 245, entitlement server 250, alarm server 255, usage management server 260, and notification server 265 may provide various interfaces to transaction services hub 230. In one implementation, each of internal user devices 240, customer portal server 245, entitlement server 250, alarm server 255, usage management server 260, and notification server 265 may be integrated with other systems/services provided by network provider 160. For example, one or more of user device 240, customer portal server 245, entitlement server 250, alarm server 255, usage management server 260, and notification server 265 may provide access to information from multiple services (e.g., wireless services, Internet services, telephone services, etc.) besides transaction services.

Internal user device 240 may include one or more computing devices, servers, or other types of computation or communication devices, that provide secure internal access to transaction services hub 230. User device 240 may, for example, allow users (e.g., a network administrator) to communicate with components of transaction services hub 230 via private secure connections. In one implementation, user device 240 may include a web browser. Users may use user device 240 to submit configuration settings, service level agreement (SLA) information, provisioning, etc. related to a particular payment processor 130.

Customer portal server 245 may include one or more network devices, or other types of computation or communication devices, that provide limited external access to transaction services hub 230. For example, customer portal server 245 may enable an authorized customer to access reporting data, residing in transaction services hub 230, that relates to a particular host (e.g., payment processor 130). In one implementation, customer portal server 245 may provide a common web-based interface to access multiple types of services (e.g., transaction services and other services). Access to services via customer portal server 245 may be restricted for example to users with registered accounts and secure passwords.

Entitlement server 250 may include one or more network devices, or other types of computation or communication devices that control what users (or user accounts) are permitted to access particular services. For example, entitlement server 250 may provide to transaction services hub 230 a file or list of user accounts that are authorized to access particular components of transaction services hub 230 (e.g., via internal user device 240 or customer portal server 245). In one implementation, entitlement server 250 may receive lists of authorized internal and/or external users from another device, such as a device associated with a subscription/account system.

Alarm server 255 may include one or more network devices, or other types of computation or communication devices that track and disperse alarm information relating to transaction services hub 230. For example, if transaction services hub 230 identifies a problem (e.g., a failed link with a payment processor 130), transaction services hub 230 may signal alarm server 255 to generate alarms to appropriate monitoring systems and/or ticketing systems. In one implementation, alarm server 255 may also consolidate and/or correlate alarms from multiple services (e.g., wireless services, Internet services, and/or transaction services).

Usage management server 260 may include one or more network devices, or other types of computation or communication devices that track system usage by customers. For example, usage management server 260 may collect transaction statistics from transaction services hub 230 to generate customer invoices.

Notification server 265 may include one or more network devices, or other types of computation or communication devices that generate notifications (e.g., email, text messages, etc.) for customers and/or internal users. For example, notification server 265 may receive indications of service interruptions (e.g., scheduled maintenance, outages, etc.) and automatically send notifications to particular customer accounts.

Although FIG. 2 shows exemplary components of network portion 200, in other implementations, network portion 200 may include fewer, different, differently-arranged, or additional components than those depicted in FIG. 2. Alternatively, or additionally, one or more components of network portion 200 may perform one or more other tasks described as being performed by one or more other components of network portion 200.

Figure 3:
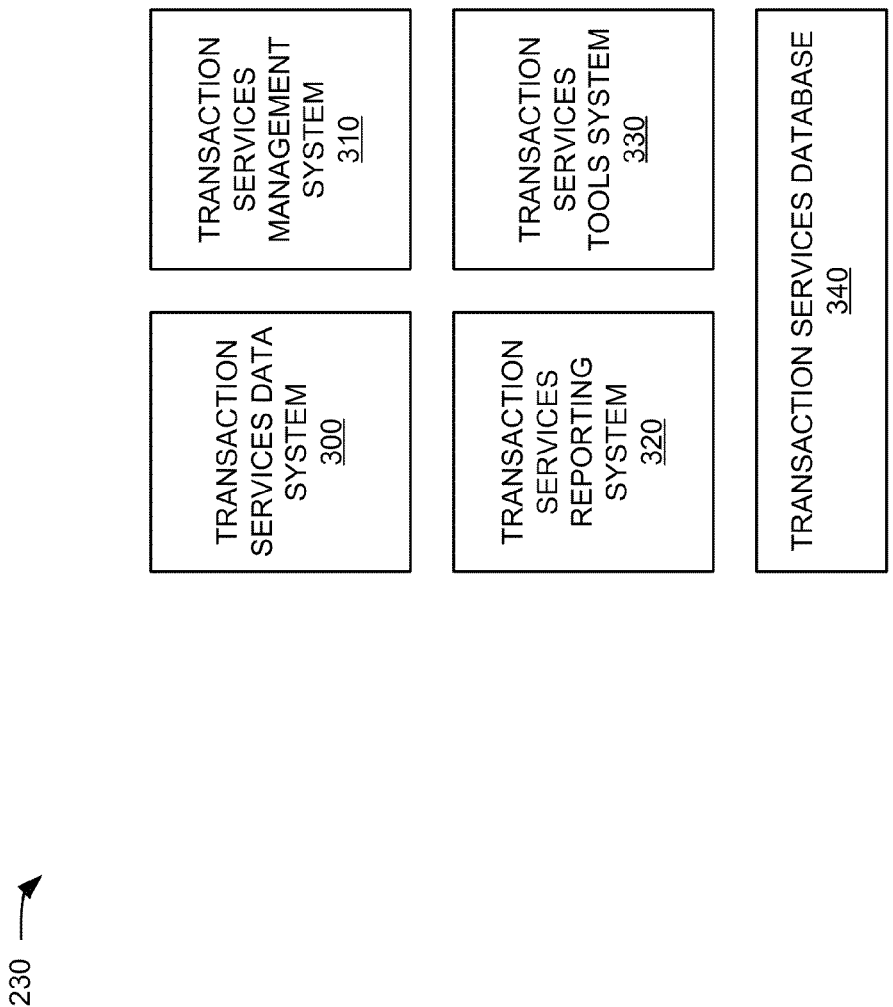
FIG. 3 is a diagram that illustrates components of a transaction services hub of FIG. 2.

FIG. 3 is a diagram that illustrates components of transaction services hub 230. As shown in FIG. 3, transaction services hub 230 may include a transaction services data system 300, a transaction services management system 310, a transaction services reporting system 320, a transaction services tools system 330, and a transaction services database 340.

Transaction services data system 300 may include one or more network devices, or other types of computation or communication devices. Generally, transaction services data system 300 may be the primary component of transaction services hub 230 for processing customer transactions. Transaction services data system 300 may manage and/or monitor customer traffic (e.g., traffic relating to transaction services). Transaction services data system 300 may communicate with other components of transaction services hub 230 (e.g., transaction services management system 310, transaction services reporting system 320, etc.) to receive configuration settings and provide transaction statistics. For example, transaction services data system 300 may log information (e.g., origination source, time, etc.) about voice network transaction requests (e.g., via voice network 205) and/or an IP network transaction requests (e.g., via 210) and send the logged information to transaction services tools system 330 and/or transaction services tools database 340. Logged information may include usage detail records; session detail records; application status records; alarm detail files; and/or log files, crash dumps, or core files from transaction services data system 300 applications. Transaction services data system 300 may also monitor the health status of customer hosts (e.g., each payment processor 130) and gather data related to each processed transaction.

In one implementation, transaction services data system 300 may include instances of a transaction gateway application for each customer (e.g., one or more instances for each payment processor 130). The transaction gateway application may be the primary driver for processing customer connections. For example, transaction services data system 300 may receive an authorization request from transaction device 120 to initiate a transaction, may route the authorization request to an appropriate payment processor 130, and may return a response (e.g., approve/reject) from payment processor 130 to transaction device 120. The transaction gateway application may also apply/strip headers for packets, identify frame start/stops, and route communications based on active monitoring/capacities. In one implementation, transaction services data system 300 may be configured as a blade system in a network device. Transaction services data system 300 may also be configured as a fully redundant system with no single point of failure.

Transaction services data system 300 may support a wide range of ingress connections from transaction devices 120. Each instances of a transaction gateway application in transaction services data system 300 may listen for TCP connections on the same set of ingress TCP port numbers (e.g., several hundred port numbers). Each ingress TCP port can be configured differently from other ingress TCP ports. The ingress TCP port configuration may determine how the connection will behave, such as which payment processor 130 the call is routed to, if and how the data flowing through will be processed, etc. Ingress TCP port configuration information may be stored in transaction services database 340 for implementation in transaction services data system 300.

Similarly, transaction services data system 300 may support egress connections to payment processor 130. Each payment processor 130 may require one of several connection protocols that a transaction gateway application can use to use to connect to payment processor 130. For example, X.25, async, TPDU, VLP, or plain TCP may be used by transaction services data system 300 to connect to one of payment processors 130. Egress connection configuration information may be stored in transaction services database 340 for implementation in transaction services data system 300.

Transaction services management system 310 may include one or more network devices, or other types of computation or communication devices. In one implementation, transaction services management system 310 may provide an internal portal (e.g., a Web-based system for internal users of network provider 160) for service delivery, operations, and marketing related to transaction services provided by transaction services hub 230. For example, transaction services management system 310 may provide for customer provisioning, configuration management, reporting, troubleshooting, and/or SLA management and publishing. In one implementation, users (e.g., network administrators for network provider 160) may access transaction services management system 310 via internal user device 240. Transaction services management system 330 is described further in connection with, for example, FIGS. 5-12.

Transaction services reporting system 320 may include one or more network devices, or other types of computation or communication devices. Transaction services reporting system 320 may provide to customers (e.g., users associated with payment processor 130) reporting and/or administrative tools for transaction services provided by transaction network 110. In one implementation, customers may access transaction services reporting system 320 via a customer portal (e.g., a Web-based system for external users of network provider 160). For example, customer portal server 245 may provide a gateway to transaction services reporting system 320. Transaction services reporting system 320 may provide customers with a variety of reporting formats/data and may give customers the ability to manage traffic to particular hosts using, for example, a Web-based interface.

Transaction services tools system 330 may include one or more network devices, or other types of computation or communication devices. Transaction services tools system 330 may include collector applications and tools applications. The collector applications generally may receive and format data for storage. The tool applications generally may provide a variety of applications to manipulate, process, and/or control reporting of stored data. In one implementation, transaction services tools system 330 may provide interfaces to billing, provisioning, monitoring, customer notification, and enterprise support systems. Transaction services tools system 330 may also include various tools to manage and maintain the other components. In one implementation, transaction services tools system 330 may also communicate with a back-end database (e.g., transaction services database 340) to format and store statistics of processed transactions.

Transaction services database 340 may store transaction information collected and/or generated by one or more of transaction services data system 300, transaction services management system 310, transaction services reporting system 320, and transaction services tools system 330. In one implementation, stored information in transaction services database 340 may be retrieved directly by one of transaction services data system 300, transaction services management system 310, transaction services reporting system 320, or transaction services tools system 330. In another implementation, transaction services tools system 330 may process data retrieval requests from the other transaction services hub 230 components. In one implementation, transaction services database 340 may include stored procedures (e.g., subprograms, such as Oracle® Stored Procedures, etc.) to manipulate data. For example, access to transaction services database 340 from a website (e.g., from transaction services management system 320 via internal user device 240) may be completed using calls to stored procedures to prevent common security breaches, such as SQL injection, etc. Thus, components of transaction services hub 230 may access transaction services database 340 using calls to stored procedures.

Although FIG. 3 shows exemplary components of transaction services hub 230, in other implementations, transaction services hub 230 may include fewer, different, differently-arranged, or additional components than depicted in FIG. 3. Alternatively, or additionally, one or more components of transaction services hub 230 may perform one or more other tasks described as being performed by one or more other components of transaction services hub 230.

Figure 4:
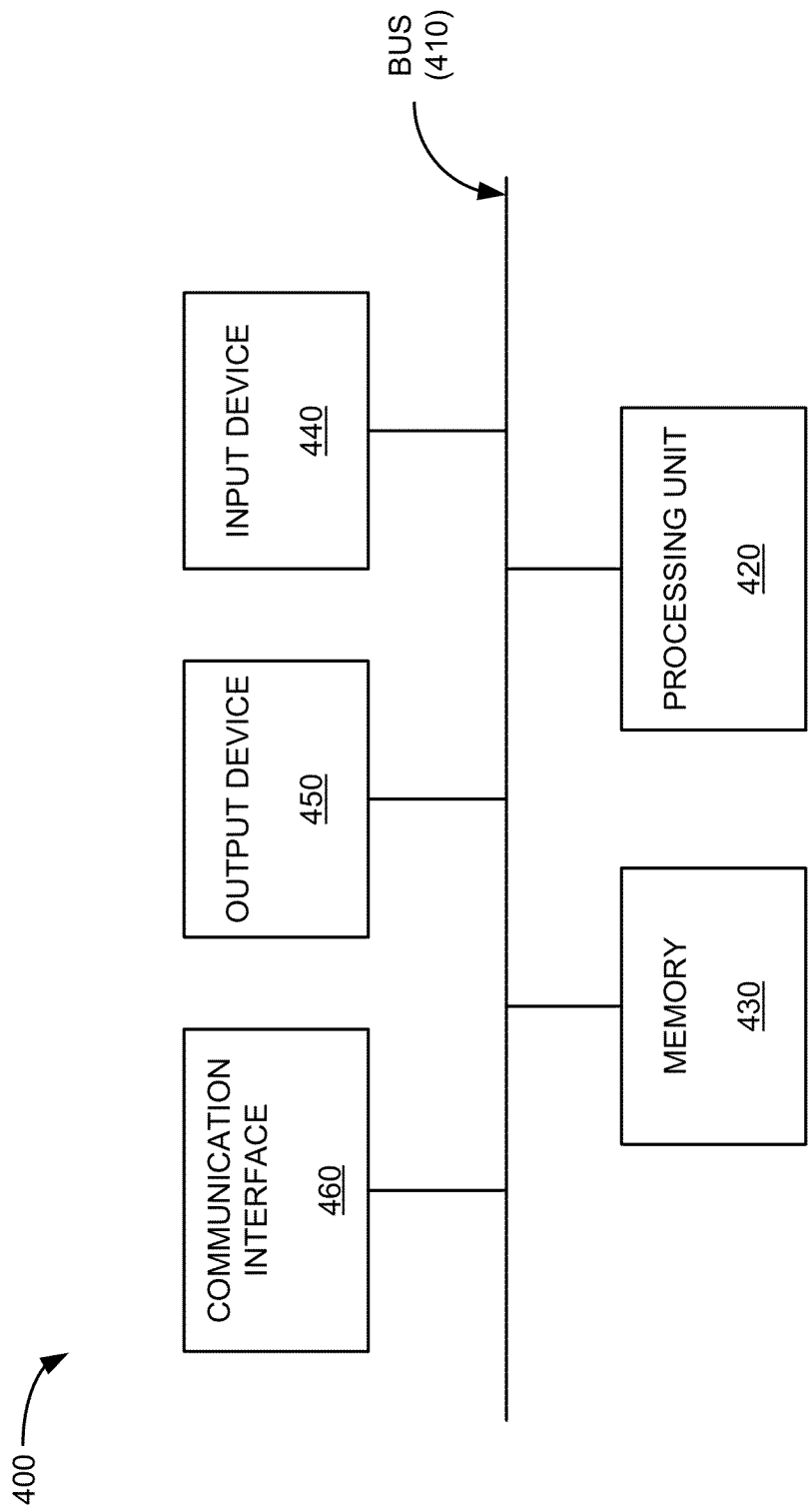
FIG. 4 is a diagram of exemplary components of a device that may be used within the network of FIGS. 1-3.

FIG. 4 is a diagram of exemplary components of a device 400. Device 400 may correspond to transaction device 120, payment processor 130, dial access server 215, gateway 220, load balancer 235, user device 240, customer portal server 245, entitlement server 250, alarm server 255, usage management server 260, notification server 265, transaction services data system 300, transaction services management system 310, transaction services reporting system 320, transaction services tools system 330, or transaction services database 340. Each of transaction device 120, payment processor 130, dial access server 215, gateway 220, load balancer 235, user device 240, customer portal server 245, entitlement server 250, alarm server 255, usage management server 260, notification server 265, transaction services data system 300, transaction services management system 310, transaction services reporting system 320, transaction services tools system 330, and transaction services database 340 may include one or more devices 400. As shown in FIG. 4, device 400 may include a bus 410, a processing unit 420, a memory 430, an input device 440, an output device 450, and a communication interface 460.

Bus 410 may permit communication among the components of device 400. Processing unit 420 may include one or more processors or microprocessors that interpret and execute instructions. In other implementations, processing unit 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processing unit 420, a read only memory (ROM) or another type of static storage device that stores static information and instructions for execution by processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, or the like. Output device 450 may include a device that outputs information to the operator, such as a display, a speaker, etc.

Communication interface 460 may include a transceiver (e.g., a transmitter and/or receiver) that enables device 400 to communicate with other devices and/or systems. For example, communication interface 460 may include mechanisms for communicating with other devices, such as other devices of network 100 or another device 400.

As described herein, device 400 may perform certain operations in response to processing unit 420 executing software instructions contained in a computer-readable medium, such as memory 430. A computer-readable medium may include a non-transitory memory device. A memory device may include space within a single physical memory device or spread across multiple physical memory devices. The software instructions may be read into memory 430 from another computer-readable medium or from another device via communication interface 460. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may include fewer components, different components, differently arranged components, or additional components than depicted in FIG. 4. As an example, in some implementations, input device 440 and/or output device 450 may not be implemented by device 400. In these situations, device 400 may be a "headless" device that does not explicitly include an input or an output device. Alternatively, or additionally, one or more components of device 400 may perform one or more other tasks described as being performed by one or more other components of device 400.

Figure 5A:
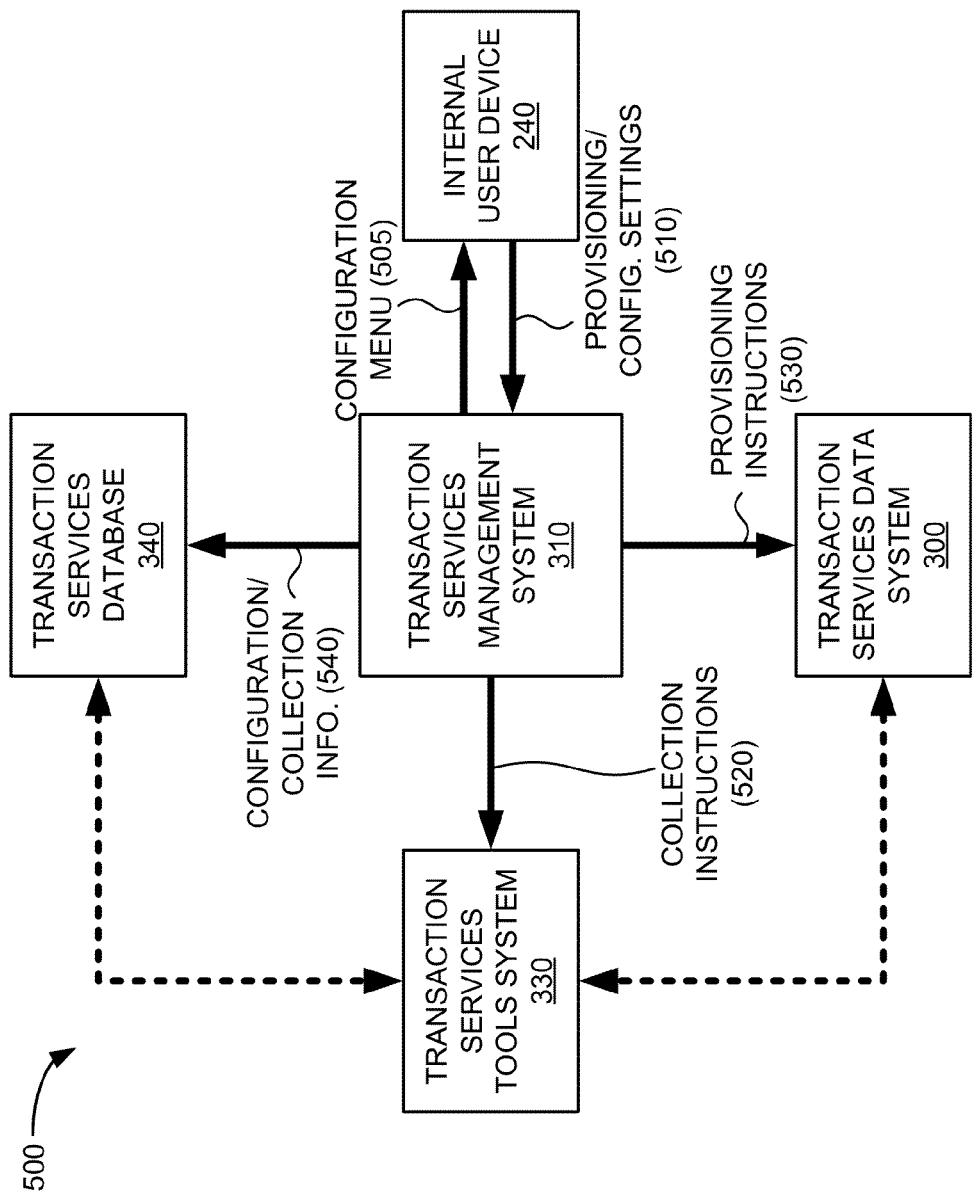

FIGS. 5A and 5B are diagrams of exemplary communications for a portion 500 of network portion 100. As shown in FIGS. 5A and 5B, network portion 500 may include internal user device 240, transaction service data system 300, transaction service management system 310, transaction service tools system 330, and transaction services database 340.

Referring to FIG. 5A, transaction service management system 310 may provide a configuration menu 505 to internal user device 240. Configuration menu 505 may provide options to view and/or change configuration settings for transaction network 110. Configuration menu 505 may provide, for example, a web-based interface (e.g., a graphical user interface) for users of internal user device 240. Users of internal user device 240 may access transaction services management system 310 using a secure interface including, for example, a private network connection and a password-protected account. Internal user device 240 may present configuration menu 505 to a user (e.g., via the web page interface). A user may select or input (e.g., via the web-page interface) particular settings from configuration menu 505. For example, users of internal user device 240 may select features to provision new customers, change existing customer settings, and/or request reports for particular or multiple customers. User requests and/or configurations may be provided to transaction services management system 310 as provisioning and configuration settings 510.

Transaction services management system 310 may receive provisioning and configuration settings 510 from internal user device 240. For example, user device 240 may receive, from a user, SLA requirements and other provisioning requirements to support customer contracts for access to transaction network 110. In one implementation, a user may confirm that transaction services hub 230 can support requested provisioning levels (e.g., for new transaction services customers) using other network information and/or reporting systems. Provisioning and configuration settings 510 may include, for example, bandwidth allocations, VPN connection settings, customer and client access information, etc. In another implementation, provisioning and configuration settings 510 may include a request for a particular report or set of reports.

Transaction services management system 310 may sort and distribute information from provisioning and configuration settings 510 to other components of transaction services hub 230. For example, based on provisioning/configuration settings 510, transaction services management system 310 may provide collection instructions 520 to transaction services tools system 330, provisioning instructions 530 to transaction services data system 300, and/or configuration/collection information 540 to transaction services database 340.

In one implementation, transaction services management system 310 may provide collection instructions 520 to transaction services tools system 300 based on provisioning/configuration settings 510. Collection instructions 520 may identify, for example, types of information to collect during transactions, collection intervals, etc. Transaction services management system 310 may also provide provisioning instructions 530 to transaction services data system 300 based on provisioning/configuration settings 510. Provisioning instructions 530 may include, for example, routing information, bandwidth reservations, port information, etc. required to support data transfers to/from a particular customer (e.g., payment processor 130).

Additionally, or alternatively, transaction services management system 310 may communicate indirectly with transaction services data system 300 and/or transaction services tools system 330 via transaction services database 340. For example, based on provisioning/configuration settings 510, transaction services management system 310 may provide configuration/collection information 540 to transaction services database 340. Transaction services tools system 330 may periodically scan transaction services database 340 to retrieve and implement configuration/collection information 540, including, for example, forwarding applicable information to transaction services data system 300.

Referring to FIG. 5B, transaction service management system 310 may provide a report selection menu 550 to internal user device 240. Report selection menu 550 may provide options to select and/or run standard reports. Reports selection menu 550 may include, for example, a list of menu items, a tiered listing, or another arrangement of report selections. Internal user device 240 may present report selection menu 550 to a user (e.g., via a web page interface). A user may select (e.g., via the web-page interface) a particular report from report selection menu 550.

Based on the user's selection from report selection menu 550, internal user device 240 may submit a report request 560 to transaction service management system 310. Transaction service management system 310 may receive report request 560 and may retrieve data from transaction services database 340 for the requested report, as indicated by reference number 570. Additionally, or alternatively, transaction services tools system 330 may facilitate data transactions between transaction service management system 310 and transaction services database 340. For example, in response to report request 560, transaction service management system 310 may provide a data request 580 to transaction service tools system 330. Transaction service tools system 330 may generate calls to stored procedures in transaction services database 340 to retrieve requested data. The requested data may be forwarded from transaction service tools system 330 to transaction services management system 310, as indicated by data response 580.

Transaction services management system 310 may receive data from transaction services database 340 and/or transaction services tools system 330 and may format the data into a formatted report, chart, etc. Transaction services management system 310 may forward the formatted data to internal user device 240 as data reports 590.

Although FIGS. 5A and 5B include exemplary components of network portion 500, in other implementations, network portion 500 may include fewer, different, differently-arranged, or additional components than those depicted in FIG. 5. Alternatively, or additionally, one or more components of network portion 500 may perform one or more other tasks described as being performed by one or more other components of network portion 500.

Figure 6:
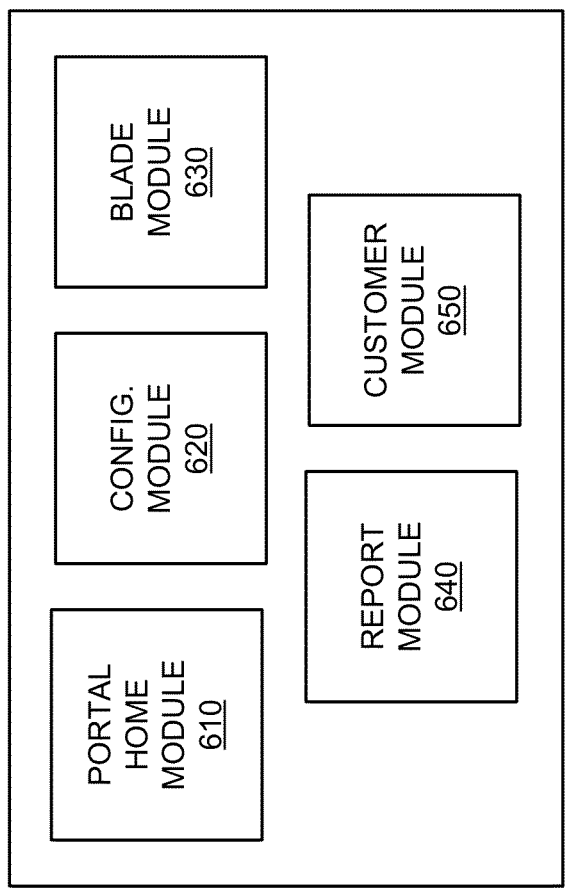
FIG. 6 is a block diagram of exemplary functional components of the transaction services management system of FIG. 3.

FIG. 6 is a block diagram of exemplary functional components of transaction services management system 310. As shown, transaction services management system 310 may include a portal home module 610, a configuration module 620, a blade module 630, a report module 640, and a customer module 650. Depending on the implementation, transaction services management system 310 may include additional, fewer, or different functional components than those illustrated in FIG. 6.

Figure 7:
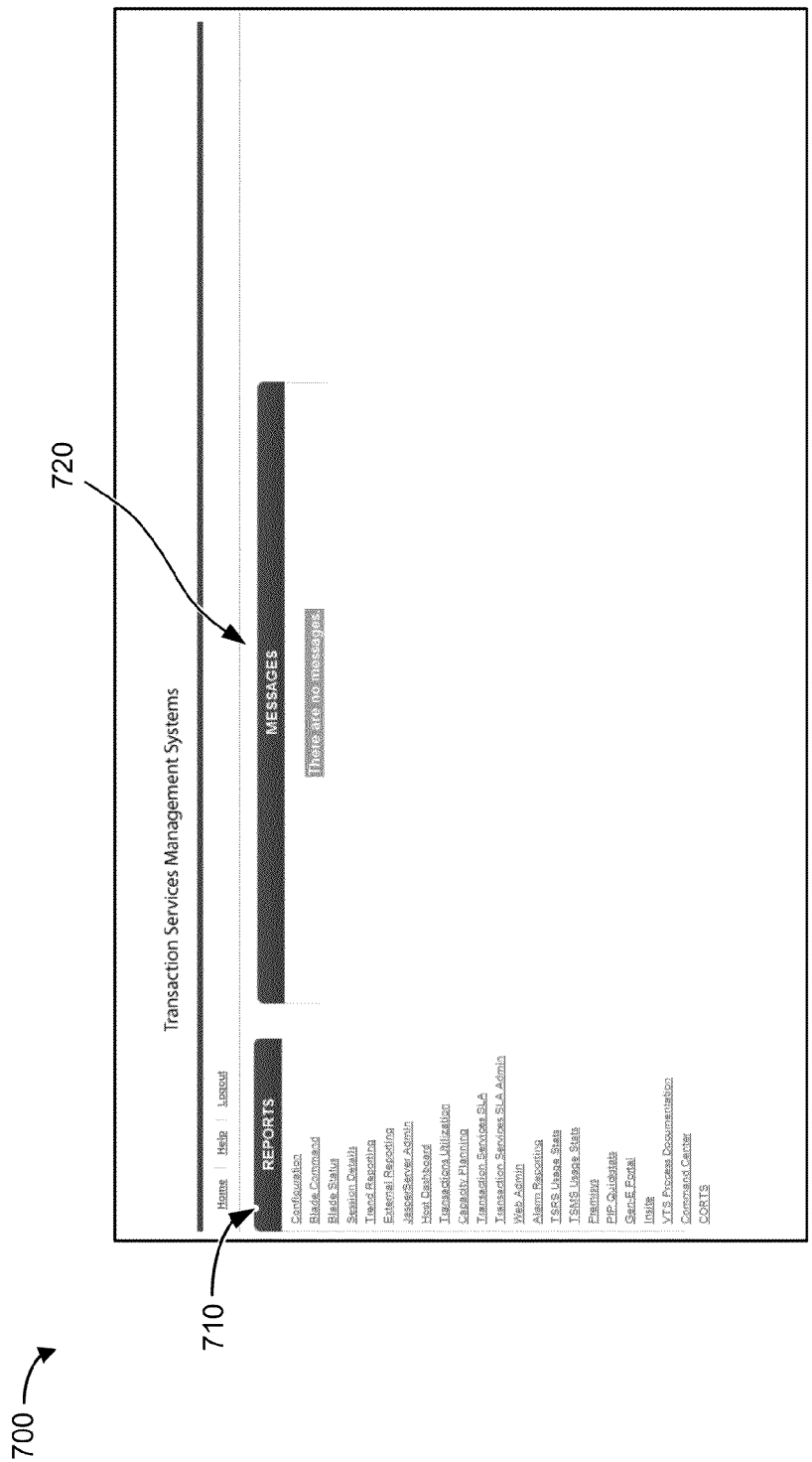
FIG. 7 is a diagram of a portal home user interface for the transaction services management system of FIG. 3.

Portal home module 610 may generate and provide a portal home page associated with internal users generally (e.g., network administrators) a particular internal user account. For example, portal home module 610 may provide the portal home page in response to a successful login for a particular host account or in response to selection of a transaction services option from a menu of possible services available to logged-in users. The portal home page may include graphical user interface including a navigation menu and a variety of information relating to transaction network 110. FIG. 7 provides a sample user interface 700 that may correspond to a portal home page generated by portal home module 610. User interface 700 may include a tools menu 710 and a message section 720.

Tools menu 710 may include menu options to select, for example, among configuration settings, blade information, pre-formatted reports, usage information, and/or administration functions. Menu items for tools menu 710 may be grouped by categories and sub-categories. Selection of menu items from tools menu 710 may cause transaction services management system 310 to launch other functional components described below.

User interface 700 may also include message section 720. Message section 720 may include general notices for transaction network 110 or user-specific notices that may relate to a particular login account. For example, portal home module 710 may provide notifications for scheduled maintenance, account changes, and/or other information within message section 720.

Referring again to FIG. 6, configuration module 620 may provide administrators with the ability to modify various components of transaction services data system 300 and/or transaction service tools system 330. For example, configuration module 620 may permit configuration changes to ingress connections (e.g., from transaction devices 120 to transaction services data system 300) and egress connections (e.g., from transaction services data system 300 to payment processor 130). In one implementation, configuration module 620 may provide to a user a template for a configuration change request. The configuration change request may include one or more changes to settings for transaction services data system 300. For example, the configuration change request may include changes to software applications (e.g., new versions or new applications) to be implemented by transaction services data system 300. The configuration change request may be scheduled, for example, to be implemented automatically at a time selected by the user.

FIG. 8 provides a sample user interface 800 that may correspond to a configuration page provided by configuration module 620. User interface 800 may include a configuration menu 810 and a configuration activity section 820. Configuration menu 810 may include options for components and features that may be presented and/or configured via configuration module 620. Selected options from configuration menu 810 may be presented in configuration activity section 820. For example, configuration menu 810 may include a home option, a summary option, an ingress option, a routing tables (RTabs) option, a bank identification number (BIN) tables (BTabs) option, a customers option, a hosts option, a configuration change requests (CCRs) option, and a dial access server configuration (TraxCfg) option. Each option in configuration menu 810 may include a corresponding interactive display in configuration activity section 820.

The home option may include a default page for a particular user (e.g., based on account login information). The summary option may include an overview of current transaction services, such as a number of customers, destinations, network capacity, etc.

The ingress option may include settings associated with ingress TCP ports available for use by transaction services data system 300. In the example of FIG. 8, information in configuration activity section 820 may correspond to selection of the ingress option. The ingress option may provide an ingress TCP port summary view that associates an access number (e.g., a toll-free telephone number) with a TCP port number, customer name, application version, and/or other information. Other ingress TCP port setting may include, for example, header length configurations and identifiers to allow a customer to be billed differently depending on the type of ingress (e.g., dial, SSL, etc.).

The routing tables (Rtabs) option may include links to view routing tables of particular customers. For example, each customer routing table may include a list of customer host destinations (e.g., multiple payment processors 130) and a method for rotating among them. Methods may include weighted orders, random distributions, etc.

The bank identification number tables (Btabs) option may include settings associated with bin number tables. The bin number table may provide a mapping between a range of bin numbers and a routing table. In some cases the mapping can be direct. In other cases, the mapping can be found indirectly via other table lookups.

The customer's option may include a list of customer names and/or links to customer summary information, such as location information, primary contact, device identifiers, etc. The host option may include configuration information for a customer host application, such as applications that may reside on payment processor 130 to receive transaction requests. The equipment option may include equipment descriptions and settings for physical components of transaction network 110, such as transaction services data system 300, dial access server 215, and load balancer 235.

The configuration change requests option may include a user interface and/or template to prepare configuration change requests for components of transaction services hub 230, such as transaction services data system 300. The configuration change request may include particular fields with, drop-down menus, free text entry, or check boxes, to guide users through configuration options for particular ingress and/or egress connections.

Dial access server configuration (TraxCfg) option may include settings to extract and/or view configuration data from proprietary servers, such as dial access server 215. Configuration information from dial access server 215 may include, for example, Dialed Number Identification Service (DNIS) to ingress TCP port mapping data and configuration summary information.

Referring again to FIG. 6, blade module 630 may permit interaction with and/or provide reports of transaction services data system 300. In one implementation, blade module 630 may provide direct interaction with one or more servers of transaction services data system 300. Blade module 630 may include, for example, a blade configuration sub-module and a blade statistics sub-module.

Figure 9A:
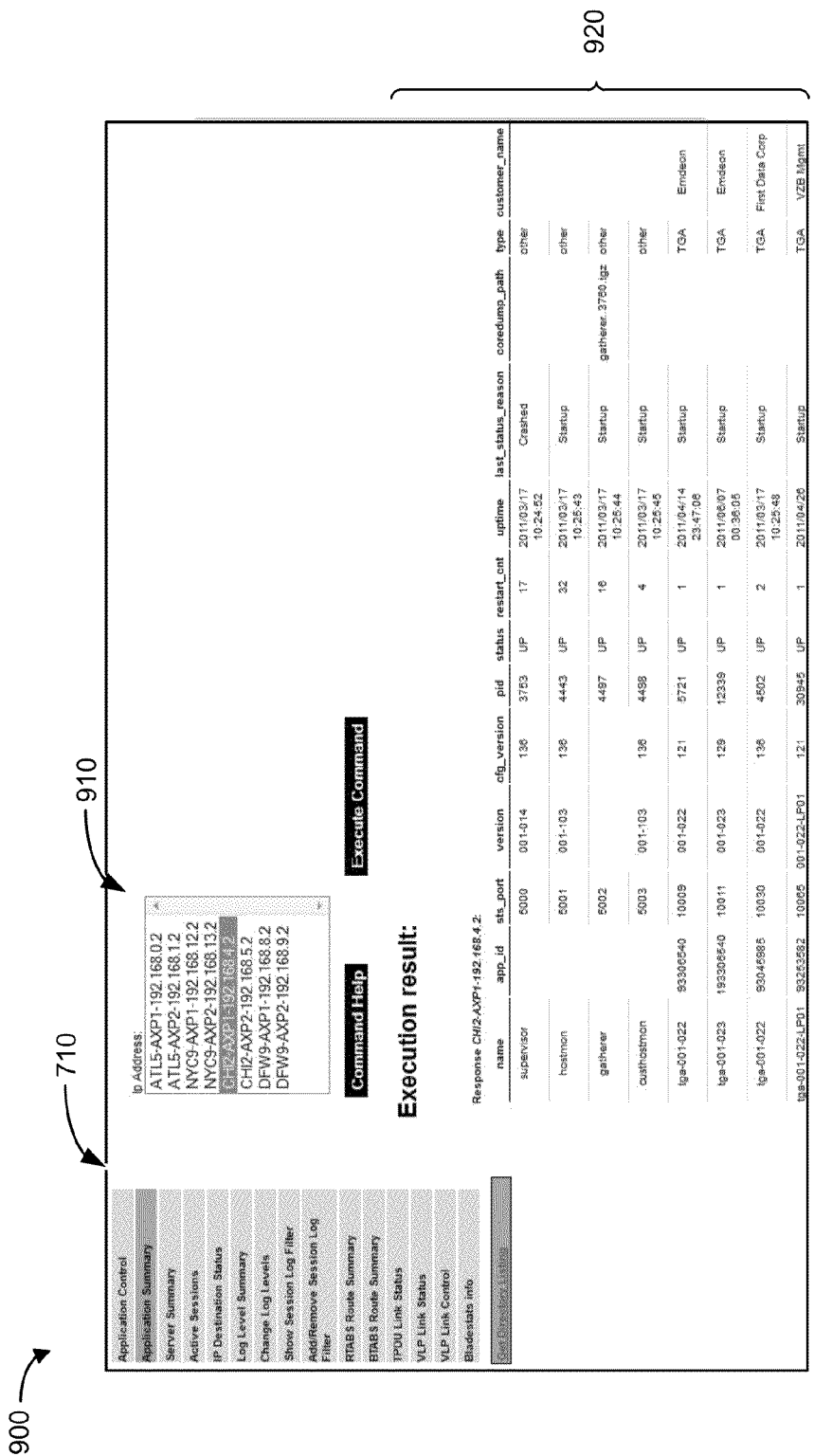
FIGS. 9A and 9B are diagrams of a blade command user interface for the transaction services management system of FIG. 3.
Figure 9B:
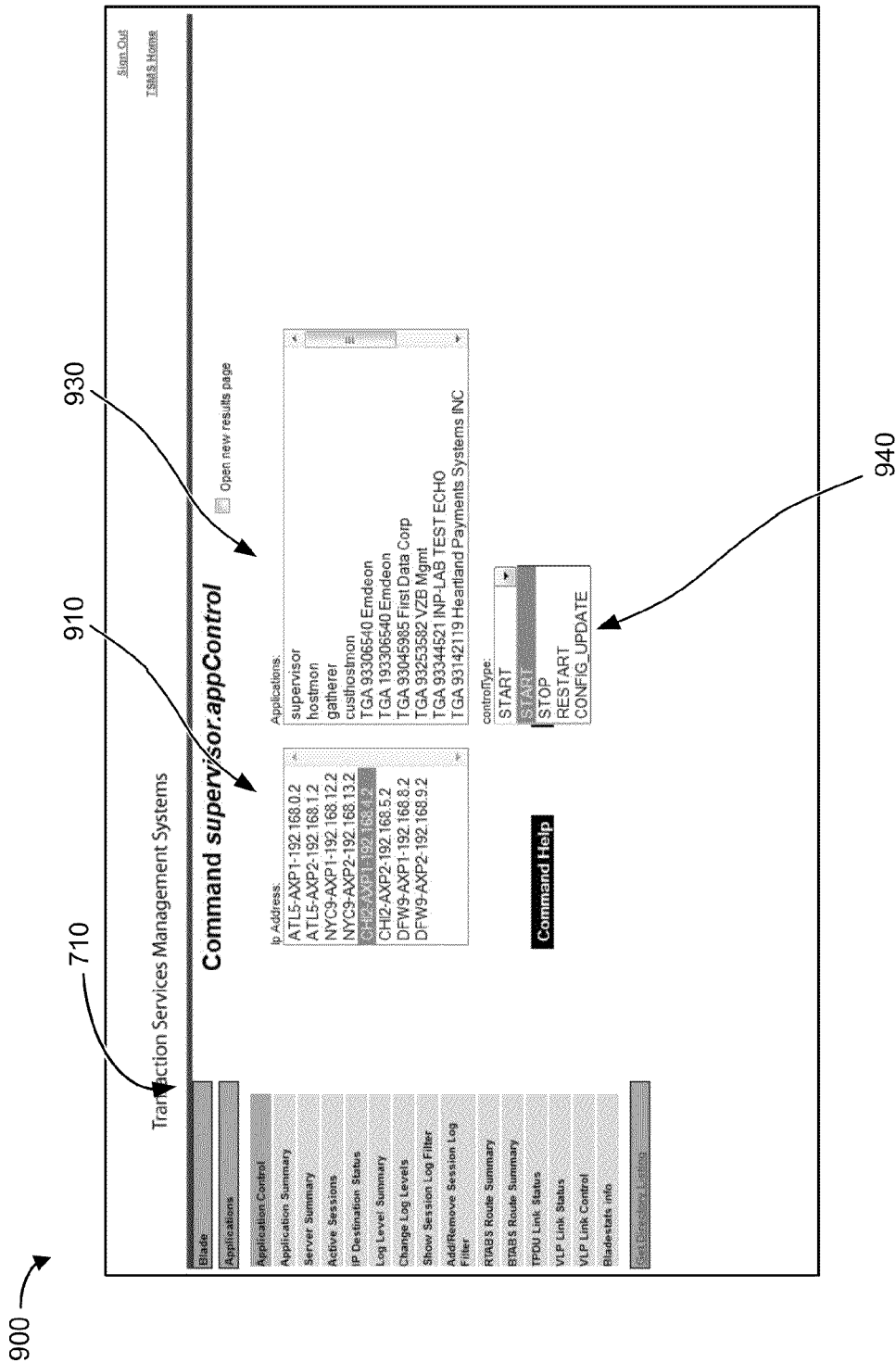

The blade configuration sub-module may communicate with one or more applications that reside on transaction services data module 300. The blade configuration sub-module may allow a user to get an immediate status of blade components, or to request an application at a particular blade (or blades) be restarted. FIGS. 9A and 9B provide a sample user interface 900 that may correspond to a blade configuration page provided by the blade configuration sub-module of blade module 630. As shown in FIG. 9A, user interface 900 may include tools menu 710, blade selection menu 910, and an execution section 920. Tools menu 710 may include menu options to select, among other options, application controls for devices (e.g., blades) in transaction services data system 300 and application summary information for devices in transaction services data system 300. As shown in FIG. 9A, for application summary information, a user may select, from blade selection menu 910, a particular blade component of transaction services data system 300 (e.g., based on an assigned IP address for each blade). In execution section 920, the blade configuration sub-module may list a summary of particular applications associated with the device for the selected IP address and current status information.

As shown in FIG. 9B, user interface 900 may also include an application selection menu 930 and a control type menu 940. Similar to application summaries, for application controls, a user may also select, from blade selection menu 910, a particular blade component of transaction services data system 300. The blade configuration sub-module may present application selection menu 930 including particular applications associated with the selected blade and control type menu 940 including available controls for particular applications. Using user interface 900, a user may provide instructions to, for example, start, stop, or restart a particular application running on a particular blade. Based on the selections of user interface 900, blade module 630 may communicate directly with transaction services data system 300 to perform the application controls.

The blade statistics sub-module of blade module 630 may retrieve data from transaction services data system 300 and/or transaction services database 340 to provide statics that are not tied to particular transaction sessions. For example, the blade statistics sub-module may present non-per-session data from for the blade devices transaction services data module 300. The non-per-session data may be associated with entities (in contrast with particular transaction sessions) such as the blade, applications on the blade, etc. The data may be used, for example, gauge the health of the various blade devices and applications. In other cases, the data may be used as a verification check to make sure that there are no leaks in the session level data reaching transaction services database 340.

FIG. 10 provides a sample user interface 1000 that may correspond to a blade status page provided by the blade statistics sub-module of blade module 630. Referring to FIG. 10, a user interface 1000 may include a filter control 1010 and a report section 1020. Filter control 1010 may include an interactive interface to permit a user to select particular filter criteria, such as time periods and/or application types. Report section 1020 may include data for a variety of fields associated with devices (e.g., blades) or applications for transaction services data system 300.

Returning to FIG. 6, report module 640 may generate request forms and pre-formatted reports. Generally, report module 640 may provide reports to mirror any reports generated for customers via transaction services reporting system 320. Additionally, or alternatively, users of transaction services management system 310 may have access to several additional fields with internal information that might be useful in isolating problems. In one implementation, report module 640 may generate session reports, trend reports (e.g., for one or multiple customers), alarm reports, or other information. The session reports may allow a user to view reports on different aspects (or combinations of aspects) of sessions (e.g., transaction services sessions for a particular host). For example, report module 640 may provide a list of available fields (e.g., from records in database 340) and criteria that may be included in a customized report. A user of user device 240 may select desired options via a web interface and may submit the selections to transaction service management system 310.

Figure 11:
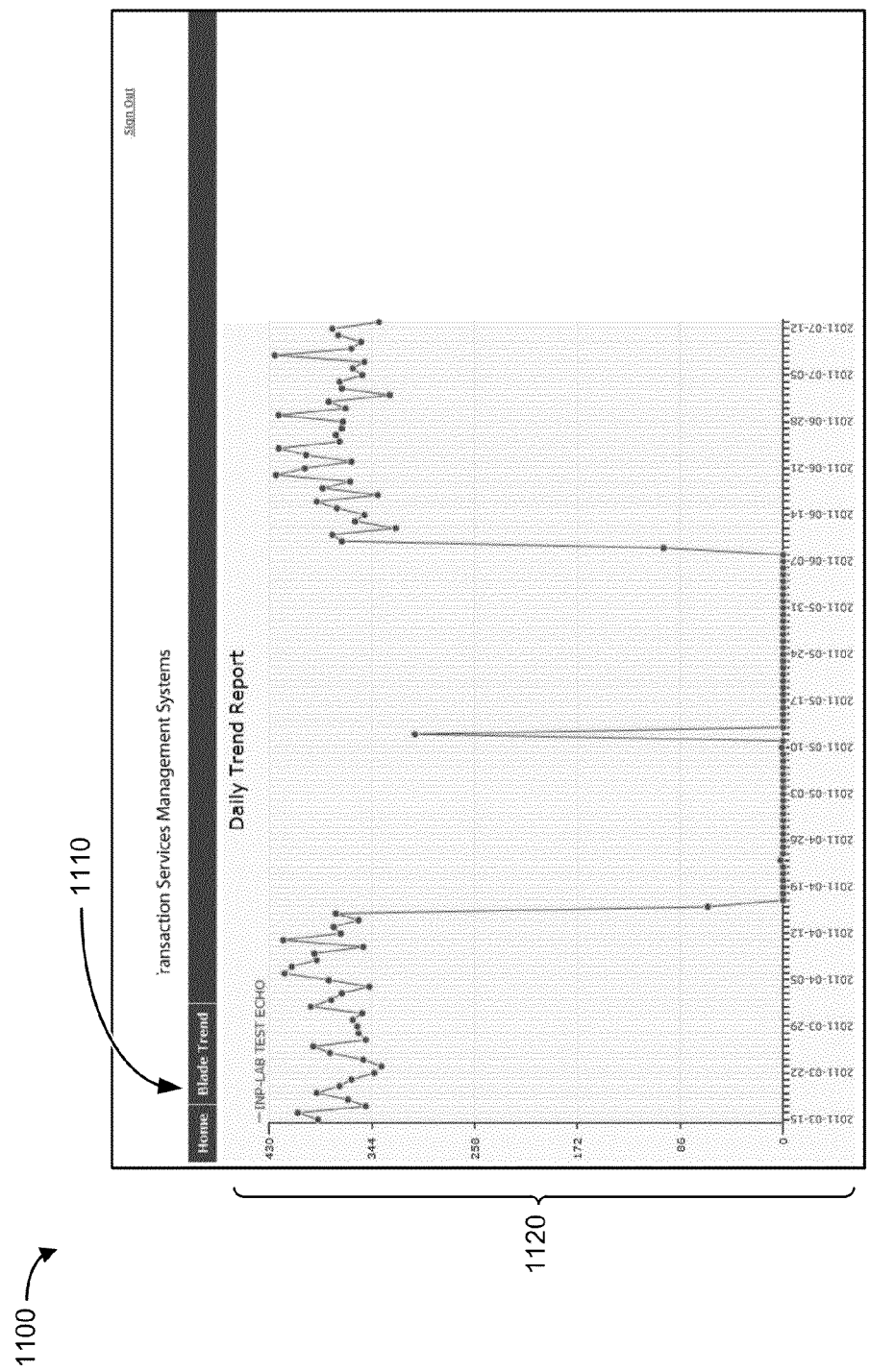
FIG. 11 is a diagram of a trend reporting user interface for the transaction services management system of FIG. 3.

Report module 640 may provide graphical and/or tabular (e.g., web based or text file) views of a customer's overall traffic pattern in a daily, weekly, or monthly view. These trend reports can be used to compare customers, group customers together, or simply display the traffic patterns for a single customer. FIG. 11 provides a sample user interface 1100 that may correspond to a trend reporting page provided by report module 640. User interface 1100 may include a navigation menu 1110 and a report section 1120. Navigation menu 1110 may include menu items to permit a user to navigate to a home page, a report option, or other user interface options. Report section 1120 may provide a chart, graph, or table of trends. Particularly, as shown in FIG. 11, report module 640 may generate a graphical representation of the number of transactions each day for a particular customer.

Report module 640 may also include alarm reporting to provides users with a view of all currently active alarms, a historical view of alarms, as well as user interfaces allowing some alarm thresholds to be configured. For example, alarm thresholds for ingress and/or egress connections involving transaction services data system 300 may be adjusted via report module 640. FIG. 12 provides a sample user interface 1200 that may correspond to an alarm reporting page provided by report module 640. User interface 1200 may include a navigation menu 1210 and an alarm report section 1220. Navigation menu 1210 may include menu items to permit a user to navigate to a home page, a multiple alarm reporting options, or other user interface options. Alarm report section 1220 may include, for example, a sortable list of alarms with other fields including details about each alarm. Alarms may be filtered, for example, by specific customers, by particular devices (e.g., transaction services data system 300, payment processor 130, etc.), or by particular time periods. Alarm details may include, for example, the type of alarm, relevant time periods, affected devices, affected ports, etc.

Returning to FIG. 6, report module 640 may also generate other standardized reports (not shown) based on selection of other menu items. For example, report module 640 may generate a session details report (e.g., to view customized views into session detail records), a capacity planning tool (e.g., including usage and capacity by site for dial access server 215), a web site usage report (e.g., tracking use of access to transaction services management system 310 and/or transaction services reporting system 320), a transaction counts report (e.g., the number of transactions over particular intervals), an application detail report (e.g., providing a monthly summary for the application and month/year), an access detail report (e.g., showing the total number of sessions by month and ingress method), a locale summary report (e.g., providing a summary of session counts, ingress characters, reply characters and duration of the session), a locale detail report (e.g., showing the total number of sessions by month and access method), an average time on the network (e.g., transaction network 110) reports (e.g., graph plotting the average time on the network for the sessions, as well as a plot for the session taking the longest time on the network), and/or a counts of time on the network report (e.g., showing the count of occurrences against the amount of time for a single application). Each report generated by session report module 640 may be responsive to a particular filtering criteria defined by the user. In other implementations, a default filtering criteria (e.g., default time period or another range) may be implemented.

Still referring to FIG. 6, customer module 650 may provide access to particular customer information. In one implementation, customer module 650 may retrieve/request information from another server (e.g., entitlement server 250, usage management server 260, etc.) to get information specific to transaction network customers, including but not limited to phone number lists, circuit lists, and/or contact lists.

FIG. 13 is a flowchart of an exemplary process 1300 for providing transaction management services, according to an implementation described herein. In one implementation, process 1300 may be performed by one or more components of transaction services management system 310, such as one or more processing units 420. In another implementation, one or more blocks of process 1300 may be performed by one or more other devices or a group of devices including or transaction services management system 310.

Process 1300 may include providing a user interface with configuration options for a transaction network (block 1310). For example, as described in connection with FIG. 5A, transaction service management system 310 may provide a configuration menu 505 to internal user device 240. Configuration menu 505 may provide options to view and/or change configuration settings for transaction network 110. Users of user internal device 240 may access transaction services management system 310 using a secure interface including, for example, a private network connection and a password-protected account.

Process 1300 may also include receiving configuration settings for transaction services associated with a particular customer (block 1320), and providing the configuration settings to a transaction services database (block 1330). For example, as described above in connection with FIG. 5A, user requests and/or configurations may be provided to transaction services management system 310 as provisioning and configuration settings 510. Transaction services management system 310 may provide provisioning instructions 530 to transaction services data system 300 based on provisioning/configuration settings 510. Provisioning instructions 530 may include, for example, routing information, bandwidth reservations, port information, etc. required to support data transfers to/from a particular customer (e.g., payment processor 130).

Process 1300 may further include receiving a report request for non-session-specific data (block 1340) and retrieving, from the transaction services database, non-session-specific data for the requested report (block 1350). For example, as described above in connection with FIG. 5B, transaction service management system 310 may provide a report selection menu 550 to internal user device 240. Report selection menu 550 may provide options to select and/or run standard reports. A user of user device 240 may select (e.g., via the web-page interface) a particular report from report selection menu 550. Based on the user's selection from report selection menu 550, internal user device 240 may submit a report request 560 to transaction service management system 310. Transaction service management system 310 may receive report request 560 and may retrieve data 570 from transaction services database 340 for the requested report.

Process 1300 may also include providing the requested report to a user device (block 1360). For example, as described above in connection with FIG. 5B, transaction services management system 310 may receive data 570 from transaction services database 340 and/or transaction services tools system 330 and may format data 570 into a formatted report, chart, etc. Transaction services management system 310 may forward the formatted data to internal user device 240 as data reports 590.

Systems and/or methods described herein may provide transaction services management services to administrators of a transaction network. The systems and/or methods may include web-based interfaces to manage configuration settings for network device and particular connection types. The systems and methods may also include web-based interfaces to view reports for particular customers or system-wide data.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 13, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. One or more devices within a transaction services hub that maintains secure sessions with customer payment processor devices associated with a transaction network, the one or more devices comprising:
    a memory to store a plurality of instructions; and
    one or more processors configured to execute the instructions in the memory to:
        provide, to a user device via a private network, a user interface with configuration options for the transaction network, wherein the transaction network links merchant devices to the customer payment processor devices,
        receive, from the user device and via the user interface, configuration settings for transaction services associated with a particular customer,
        store, in response to receiving the configuration settings, the configuration settings in a database of transaction services data for multiple customers, wherein the configuration settings are stored for retrieval by a network device in the transaction network for implementation, and
        reserve bandwidth in a multiprotocol label switching (MPLS) network within the transaction network, based on the configuration settings, to support the transaction services over the transaction services network between the merchant devices and the host device.

2. The device of claim 1, wherein the processor is further configured to:
    receive, via the user interface, a report request for non-session-specific data,
    retrieve, from another network device that is separate from the database, non-session-specific data relevant to the report request,
    generate, based on the request and the non-session-specific data, a report for the user interface, and
    send, to the user device, the report for the user interface.

3. The device of claim 1, wherein the processor is further configured to:
    receive, via the user interface, a report request for session-specific data,
    retrieve, from the database, session-specific data relevant to the report request,
    generate, based on the request and the session-specific data, a report for the user interface, and
    send, to the user device, the report for the user interface.

4. The device of claim 3, wherein, when retrieving the session-specific data relevant to the report request, the processor is further configured to:
    access the database using calls to stored procedures.

5. The device of claim 1, wherein the user interface includes a template for a configuration change request to be automatically implemented by a network device at a scheduled time.

6. The device of claim 1, wherein the database of transaction services data includes transaction data for transactions over a domestic toll-free voice network, an international toll-free voice network, and an Internet Protocol network.

7. The device of claim 1, wherein the configuration settings include configurations for ingress connections from the merchant devices to one or more devices within the transaction network.

8. The device of claim 1, wherein the configuration settings include configurations for egress connections from one or more devices within the transaction network to the customer payment processor devices.

9. The device of claim 1, wherein the configuration settings include alarm thresholds for egress connections from one or more devices within the transaction network to the customer payment processor devices.

10. The device of claim 1, wherein the processor is further configured to:
    receive, from the user device, other configuration settings for transaction services associated with a particular network device, and
    send, in response to receiving the other configuration settings, instructions to the particular network device to invoke the other configuration settings.

11. The device of claim 10, wherein the other configuration settings include requests to start, stop, or restart a particular application running on the particular network device.

12. A method, comprising:
    sending, by one or more network devices and to a user device, a user interface with options for configuring a network to provide transaction services between transaction devices and host processing devices, wherein the user interface is accessible to the user device via a private network connection;
    receiving, by the one or more network devices and from the user device, configuration settings for a particular host processing device;
    storing, by the one or more network devices, the configuration settings in a database of transaction services data for multiple host processing devices, wherein the database is configured to be accessed by another device within the network to configure the network for the particular host processing device; and reserving, by the one or more network devices and based on the configuration settings, bandwidth, in a multiprotocol label switching (MPLS) network within the transaction network, to support the transaction services over the transaction services network between the merchant devices and the host device.

13. The method of claim 12, further comprising:

receiving, from the user device, a report request for data from multiple customer hosts;

retrieving, from the database, data responsive to the report request; and generating a report based on the report request and the data responsive to the report request.

14. The method of claim 13, wherein the user interface includes a list of available fields and criteria that a user may select for a customized report.

15. The method of claim 12, further comprising:

receiving other configuration settings for transaction services associated with the other device within the network; and sending, in response to receiving the other configuration settings, instructions to the other device within the network to invoke the other configuration settings.

16. The method of claim 12, wherein the configuration settings include:

configurations for ingress connections from the transaction devices to the other device within the network; and configurations for egress connections from the other device within the network to the particular host processing device.

17. The method of claim 16, wherein the ingress connections include connections from a domestic toll-free voice network, an international toll-free voice network, and an Internet Protocol network.

18. A non-transitory computer-readable medium, comprising computer-executable instructions, for causing one or more processors executing the computer-executable instructions to:

provide, to a user device, a user interface with options for configuring a transaction network to provide ingress connections between transaction devices to a network device within the network and egress connections between the network device and a host processing device;

receive, from the user device via the user interface, first configuration settings for ingress connections associated with a particular host processing device and second configuration settings for egress connections associated with the particular host processing device, wherein the first configuration settings and the second configuration settings include bandwidth allocations to support data transfers to and from the particular host processing device;

store the first configuration settings and the second configuration settings in a database with other configuration settings associated with other host processing devices; and provide the first configuration settings and the second configuration settings to the network device for implementation.

19. The computer readable medium of claim 18, further comprising computer-executable instructions, for causing the one or more processors executing the computer-executable instructions to:

restrict access to the user interface to user devices using a private network connection.

20. The computer readable medium of claim 18, further comprising computer-executable instructions, for causing the one or more processors executing the computer-executable instructions to:

receive, from the user device via the user interface, a report request for non-session-specific data;

retrieve, from a transaction services data system, non-session-specific data relevant to the report request, generate, based on the request and the non-session-specific data, a report for the user interface, and send the report to the user device.

* * * * *